United States Patent
Krogh et al.

(10) Patent No.: US 10,410,766 B2
(45) Date of Patent: Sep. 10, 2019

(54) JOINTED POWER CABLE AND METHOD OF MANUFACTURING THE SAME

(71) Applicant: NKT HV CABLES GMBH, Baden (CH)

(72) Inventors: Flemming Krogh, Jämjö (SE); Peter Friberg, Rödeby (SE)

(73) Assignee: NKT HV Cables GmbH, Baden (CH)

( * ) Notice: Subject to any disclaimer, the term of this patent is extended or adjusted under 35 U.S.C. 154(b) by 0 days.

(21) Appl. No.: 15/528,827

(22) PCT Filed: Nov. 25, 2014

(86) PCT No.: PCT/EP2014/075488
§ 371 (c)(1),
(2) Date: May 23, 2017

(87) PCT Pub. No.: WO2016/082860
PCT Pub. Date: Jun. 2, 2016

(65) Prior Publication Data
US 2017/0330648 A1    Nov. 16, 2017

(51) Int. Cl.
*H01B 7/00* (2006.01)
*H01B 9/00* (2006.01)
(Continued)

(52) U.S. Cl.
CPC ............... *H01B 9/00* (2013.01); *B23K 13/00* (2013.01); *H01R 4/021* (2013.01); *H02G 1/14* (2013.01); *H02G 15/18* (2013.01); *H01R 4/70* (2013.01)

(58) Field of Classification Search
CPC ............ H02G 1/10; H02G 1/00; H02G 1/005; H02G 1/14; H02G 1/16; H02G 3/06;
(Continued)

(56) References Cited

U.S. PATENT DOCUMENTS 3,590,207 A    6/1971   Cox
3,717,717 A *  2/1973   Cunningham ....... H02G 15/103
                                                174/73.1
(Continued)

FOREIGN PATENT DOCUMENTS

CN    202632848 U    12/2012
CN    103000261 B     6/2014
(Continued)

OTHER PUBLICATIONS

English Translation of JP 2012022820 (Mizuno Takehiko, et al) (Year: 2012).*

(Continued)

*Primary Examiner* — Angel R Estrada
(74) *Attorney, Agent, or Firm* — Whitmyer IP Group LLC

(57) ABSTRACT

A power cable including a conductive core including a conductor including a plurality of sections, and an electrical insulation system enclosing the conductor, and a sheath enclosing the conductive core, wherein one of the plurality of sections of the conductor is a first conductor section and another of the plurality of sections of the conductor is a second conductor section, which first conductor section has a first cross-sectional layout that provides a first ampacity for the first conductor section, and which second conductor section has a second cross-sectional layout that provides a second ampacity for the second conductor section, wherein the first ampacity is higher than the second ampacity, wherein the plurality of sections are thermally joined, and wherein the electrical insulation system extends continually from the first conductor section to the second conductor section of the conductor. A method of manufacturing a power cable is also presented.

19 Claims, 3 Drawing Sheets

(51) Int. Cl.
*H02G 1/14* (2006.01)
*H02G 15/18* (2006.01)
*B23K 13/00* (2006.01)
*H01R 4/02* (2006.01)
*H01R 4/70* (2006.01)

(58) Field of Classification Search
CPC .... H02G 15/103; H02G 15/00; H02G 15/184; H01B 9/00; H01B 13/00; H01B 13/0036; H01B 7/00; B23K 13/00; H01R 4/70; H01R 4/021; H01R 4/02
USPC ....... 174/68.1, 68.3, 72 A, 70 R, 73.1, 74 R, 174/75 R, 84 R, 84 C; 428/34.9; 138/118
See application file for complete search history.

(56) References Cited

U.S. PATENT DOCUMENTS

| | | | | |
|---|---|---|---|---|
| 4,487,994 A | * | 12/1984 | Bander | H02G 15/184 174/73.1 |
| 4,496,795 A | * | 1/1985 | Konnik | B32B 27/12 174/84 R |
| 4,837,409 A | * | 6/1989 | Klosin | H01R 4/70 174/74 A |
| 5,070,597 A | * | 12/1991 | Holt | F16L 5/02 138/103 |
| 5,486,388 A | * | 1/1996 | Portas | H02G 15/1833 174/73.1 |
| 5,492,740 A | * | 2/1996 | Vallauri | B29C 61/065 174/73.1 |
| 5,821,459 A | * | 10/1998 | Cheenne-Astorino | H02G 15/103 174/73.1 |
| 6,472,600 B1 | * | 10/2002 | Osmani | H02G 15/1826 174/75 R |
| 7,683,260 B2 | * | 3/2010 | Bertini | H01R 13/5216 174/84 C |
| 7,767,909 B2 | * | 8/2010 | Krabs | H01R 4/726 174/84 C |
| 7,872,197 B2 | * | 1/2011 | Vallauri | H02G 15/103 174/88 R |

FOREIGN PATENT DOCUMENTS

| | | |
|---|---|---|
| EP | 1489691 A1 | 12/2004 |
| JP | 2012022820 A | 2/2012 |
| KR | 20120004111 A | 1/2012 |
| SE | 1400140 A1 | 3/2014 |
| WO | 2016082860 A1 | 6/2016 |

OTHER PUBLICATIONS

International Search Report Application No. PCT/EP2014/075488 Completed Date: Jul. 20, 2015; dated Jul. 24, 2015 3 Pages.
International Preliminary Report on Patentability Application No. PCT/EP2014/075488 dated Feb. 6, 2017 7 Pages.
Korean Office Action, Application No. 10-2017-7017458, dated Sep. 5, 2018, 6 Pages.
Chilean Office Action, Application No. 201701352, dated Sep. 13, 2018, 7 Pages.
Translation of Korean Office Action, Application No. 10-2017-7017458, dated Sep. 5, 2018, 6 Pages.
Japanese Office Action and Translation, Application No. 2017-546005, Completed: Nov. 21, 2018; dated Nov. 27, 2018, 4 Pages.

* cited by examiner

JOINTED POWER CABLE AND METHOD OF MANUFACTURING THE SAME

TECHNICAL FIELD

The present disclosure generally relates to power cables. In particular it relates to a jointed power cable having a conductive core comprising conductor sections that have different geometric structure relative to each other, and to a method of manufacturing such a power cable.

BACKGROUND

The existence of hot spots along part of the high voltage power cable route must generally be taken into account in high voltage power cable design. Hot spots reduce the ampacity, i.e. the maximum amount of electrical current a conductor or device can carry before sustaining immediate or progressive deterioration, of a power cable. More commonly than conductor deterioration as such, heat generated in the conductor may damage the electrical insulating system that insulates the conductor.

Hot spots occur due to environmental influences in the proximity of the power cable. This may for example be a result of the specific composition of the soil along the power cable route, which in some areas may have insufficient heat dissipating properties, resulting in higher ambient temperature for a heat-emitting power cable. Another example is a location where the power cable route passes external heat sources, for example when several power cables are closely located.

Due to hot spots, historically, an entire high voltage cable would be designed according to the worst conditions that occur along the high voltage cable route. This would normally mean that the diameter of the entire cable had to be dimensioned based on the worst conditions, resulting in over-dimensioning of the cable, and high costs associated therewith.

A known solution to the above problem is to adapt the conductor of a high voltage power cable along the power cable route, based on the conditions along this route. The same power transfer capacity may thereby be achieved along the entire length of the cable. For this purpose, the conductive core of a high voltage power cable may comprise several conductor sections having different cross-sectional layout or geometry. The majority of the length of the conductor may for example be of compacted type, which is a relatively inexpensive conductor configuration but which has a relatively low ampacity, rendering it more sensitive to ambient heat fluctuations. Sections of the conductor that are located in hot spots may be of a type that has a higher ampacity, and which therefore generally is more expensive. An example of such a conductor is one that is of segmented type, i.e. a Milliken conductor.

Jointing of different conductor sections, e.g. a conductor of compacted type and one of segmented type, as described above normally involves a bolt connection of the conductors, wherein a joint body encloses the two jointed conductors for each electrical phase. An external sleeve or collar encloses the joint bodies of all the electrical phases of the jointed power cable thus forming a stiff or rigid joint. In case the power cable has armour wires, these may be clamped or welded to the external sleeve.

SUMMARY

Jointing operations of the above type are however time consuming and expensive. Installing a stiff joint is usually combined with very significant costs since for example a laying ship and crew have to spend several days with installation.

An object of the present disclosure is therefore to provide a power cable and a method of manufacturing a power cable which solves or at least mitigates the problems of the prior art.

Hence, according to a first aspect of the present disclosure there is provided a power cable comprising a conductive core comprising a conductor including a plurality of sections, and an electrical insulation system enclosing the conductor, and a sheath enclosing the conductive core, wherein one of the plurality of sections of the conductor is a first conductor section and another of the plurality of sections of the conductor is a second conductor section, which first conductor section has a first cross-sectional layout that provides a first ampacity for the first conductor section, and which second conductor section has a second cross-sectional layout that provides a second ampacity for the second conductor section, wherein the first ampacity is higher than the second ampacity, wherein the plurality of sections are thermally joined, and wherein the electrical insulation system extends continually from the first conductor section to the second conductor section of the conductor.

By means of the thermally joined plurality of sections, a jointed power cable can be achieved during the manufacturing process of the power cable, i.e. at the factory. To this end, the entire jointed power cable may conveniently be transported in a single piece to the site of installation for cable laying, resulting in that on-site jointing at hot spot locations can be fully avoided. Due to the unwieldiness of the prior art stiff or rigid joint power cable, in particular the joint bodies, this would, without great transport difficulties, not have been possible. The time of on-site installation may thus be reduced substantially, resulting in lower installation costs.

According to one embodiment the first conductor section comprises a plurality of strands and wherein the first cross-sectional layout is a first strand configuration.

According to one embodiment the second conductor section comprises a plurality of strands and wherein the second cross-sectional layout is a second strand configuration.

According to one embodiment the first conductor section is a segmented conductor.

According to one embodiment the second conductor section is a compacted conductor.

According to one variation the plurality of sections are thermally joined by means of welding.

According to one variation the first conductor section and the second conductor section are thermally joined.

According to one embodiment the conductor comprises a joint member defining one section of the plurality of sections, wherein the first conductor section is thermally joined with the joint member at one end of the joint member and the second conductor section is thermally joined with the joint member at the other end of the joint member.

According to one embodiment the power cable is a high voltage power cable.

According to one embodiment the power cable is a subsea cable.

According to a second aspect of the present disclosure there is provided a method of manufacturing a power cable, wherein the method comprises: a) providing a first conductor, wherein the first conductor is has a first cross-sectional layout that provides a first ampacity, b) providing a second conductor, wherein the second conductor has a second cross-sectional layout that provides a second ampacity, wherein the first ampacity is higher than the second ampacity, c) thermally joining the first conductor and the second conductor, whereby the first conductor forms a first conductor section of a conductor and the second conductor forms a second conductor section of the conductor, or c') providing a joint member between the first conductor and the second conductor, and thermally joining the joint member with the first conductor and with the second conductor, wherein the first conductor forms a first conductor section of a conductor and wherein the second conductor forms a second conductor section of the conductor, d) insulating the first conductor section and the second conductor section by means of an electrical insulation system that extends continually from the first conductor section to the second conductor section, thereby forming a conductive core, and e) enclosing the conductive core by means of a sheath.

According to one embodiment the first conductor section comprises a plurality of strands and wherein the first cross-sectional layout is a first strand configuration.

According to one embodiment the second conductor section comprises a plurality of strands and wherein the second cross-sectional layout is a second strand configuration.

According to one embodiment in step c) the first conductor and the second conductor are thermally joined by means of welding, or wherein in step c') the first conductor, the joint member and the second conductor are thermally joined by means of welding.

According to one embodiment the first conductor section is a segmented conductor.

According to one embodiment the second conductor section is a compacted conductor.

According to one embodiment the power cable is a high voltage power cable.

According to one embodiment the power cable is a subsea cable.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise. Moreover, the steps of the method need not necessarily have to be carried out in the indicated order unless explicitly stated.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1A:
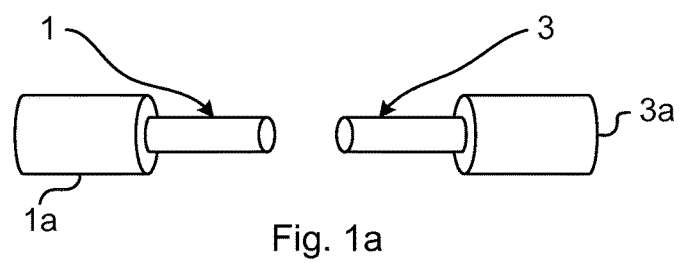
FIG. 1a is a perspective view of two conductor cores.

FIG. 1a depicts an example of a first conductor 1 and a second conductor 3 prior to thermal joining thereof to form a single conductor of a power cable. The first conductor 1 has a first cross-sectional layout, i.e. a first cross-sectional geometry. The first cross-sectional layout provides, or gives rise, to a first ampacity of the first conductor 1. The second conductor 3 has a second cross-sectional layout, i.e. second cross-sectional geometry. The second cross-sectional layout provides, or gives rise, to a second ampacity of the second conductor 3. The first cross-sectional layout and the second cross-sectional layout are thus different. The first ampacity is greater than the second ampacity. The first conductor 1 thus has a higher current-carrying capacity than the second conductor 3. This characteristic is obtained due to the conductor design, which is reflected by the cross-sectional layouts of the first conductor 1 and the second conductor 3.

Figure 1B:
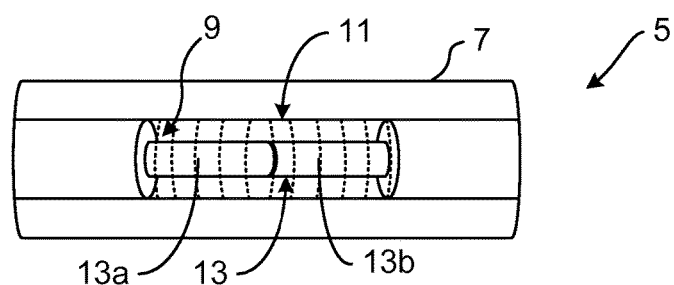
FIG. 1b shows a perspective view of an example of a power cable comprising a first conductor section and a second conductor section having different ampacity.

According to the example in FIGS. 1a-b, the first conductor 1 and the second conductor 3 both have the same, or essentially the same, diameter.

The first conductor 1 may according to one variation comprise an electrical insulation system 1a prior to thermal joining with the second conductor 3. The second conductor 3 may according to one variation comprise an electrical insulation system 3a prior to thermal joining with the first conductor 1. Further details, and variations, of the production process of a power cable formed by the first conductor 1 and the second conductor 3 will be described with reference to FIG. 4.

FIG. 1b shows a perspective view of a power cable 5, with its interior exposed. The power cable 5 comprises a sheath 7, i.e. an outer sheath, an electrical insulation system 11, and a conductor 13. The electrical insulation system 11 is arranged to electrically insulate the conductor 13. The electrical insulation system 11 thus encloses, i.e. is arranged around, the conductor 13.

The sheath 7 encloses the electrical insulation system 11 and thus also the conductor 13. The sheath 7 provides protection of the electrical insulation system 11 from environmental influence. The sheath 7 may for example be made of a thermoplastic or thermosetting polymer.

It may be noted that the power cable 5, or variations thereof, may comprise additional layers, for example an armour layer, e.g. armour wires, and/or a metallic sheath, e.g. a corrugated sheath. Furthermore, the electrical insulation system 11 may comprise one or more layers, for example an inner semiconductor layer, an intermediate polymeric layer, and an outer semiconductor layer.

The conductor 13 comprises a plurality of sections. According to the variation shown in FIG. 1b, the plurality of sections consists of a first conductor section 13a and a second conductor section 13b. The first conductor section 13a is defined by the first conductor 1 shown in FIG. 1a, and the second conductor section 13b is defined by the second conductor 3 also shown in the same figure. When they have been thermally joined they form the conductor 13.

The electrical insulation system 11 extends continually from the first conductor section 13a to the second conductor section 13b. The electrical insulation system 11 hence covers the joint formed by the thermal joining of the first conductor 1 and the second conductor 3. The conductor 13 and the electrical insulation system define a conductive core 9.

The parts of the plurality of sections are thermally joined. Thus according to the example in FIG. 1b, in which the plurality of sections consist of the first conductor section 13a and the second conductor section 13b, the first conductor section 13a and the second conductor section 13b are thermally joined. The first conductor section 13a and the second conductor section 13b may for example be thermally joined by means of welding or brazing.

At least one of the first conductor section 13a and the second conductor section 13b is stranded. Thus, at least one of the first conductor section 13a and the second conductor section 13b has a cross-sectional layout that is a stranded configuration. A stranded conductor comprises a plurality of strands that define the conductor. The strands may be arranged in a plurality of ways. A stranded conductor may for example be compacted, segmented, circular stranded or a keystone or trapezoidal conductor.

Figure 2:
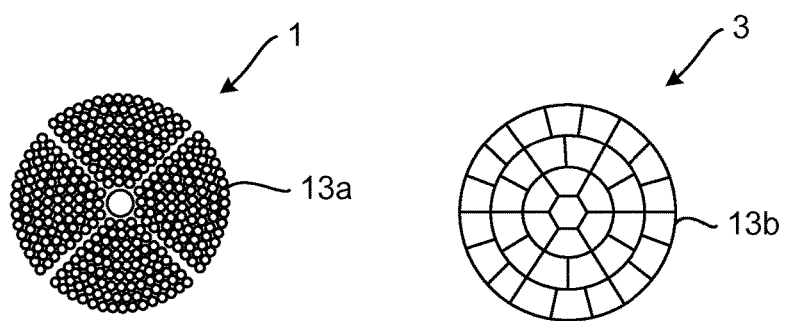
FIG. 2 depicts cross sections of two examples of conductors of the power cable in FIG. 1b.

FIG. 2 shows examples of possible cross sections of the first conductor 1, i.e. the first conductor section 13a and of the second conductor 3, i.e. the second conductor section 13b. According to the example, the first conductor section 13a has a first cross-sectional layout that is segmented and the second conductor section 13b has a second cross-sectional layout that is compacted. A compacted conductor generally has a lower ampacity than a segmented conductor that has a diameter that is essentially the same as the diameter of the compacted conductor, in case both conductors are made of the same material. Thus, according to one embodiment, the first conductor section 13a is a segmented conductor and the second conductor section 13b is a compacted conductor.

According to one variation, one of the first conductor section 13a and the second conductor section 13b may be solid. In this case, that section which is not solid is stranded.

Figure 3A:
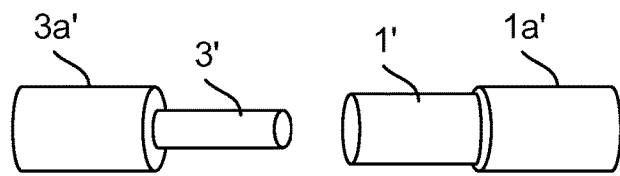
FIGS. 3a-3c show perspective views of an example of a power cable comprising a first conductor section and a second conductor section having different ampacity.
Figure 3A:
Figure 3B:
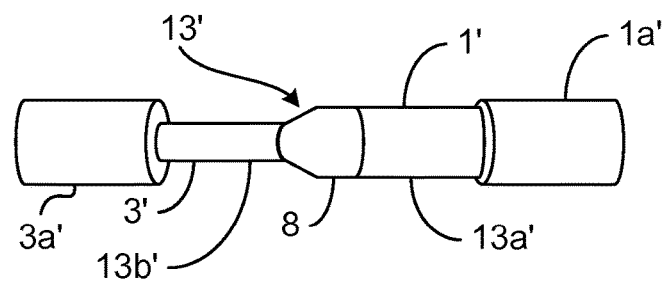
Figure 3C:
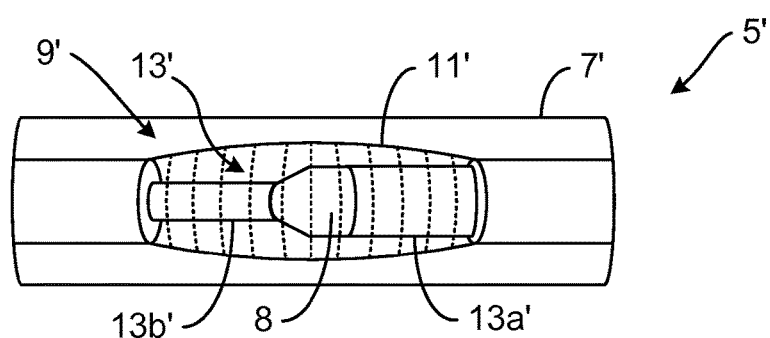

FIGS. 3a-3c show another example of a power cable. Power cable 5' comprises a conductor 13' that has a plurality of sections, namely a first conductor section 13a', a second conductor section 13b', and a joint member 8, which may be seen as a section of the conductor 13'. The joint member 8 is electrically conductive and arranged between the first conductor section 13a' and the second conductor section 13b'. The power cable 5' is thus manufactured from a first conductor 1' forming the first conductor section 13a', a second conductor 3' forming the second conductor section 13b', and the joint member 8. The plurality of sections are thermally joined. In particular the first conductor 1' is thermally joined with the joint member 8 at one end of the joint member 8 and the second conductor 3' is thermally joined with the joint member 8 at the other end of the joint member 8 to form the conductor 13'.

The first conductor section 13a' has a first cross-sectional layout and the second conductor section 13b' has a second cross-sectional layout, different from the first cross-sectional layout. A difference compared to power cable 5 in FIG. 1b is that the first conductor section 13a' has a larger diameter than the diameter of the second conductor section 13b'. This also increases the ampacity of the first conductor section 13a'.

The joint member 8 is arranged to act as a bridge that joints two conductors that have diameters that differ. The joint member 8 has a first end which has a diameter corresponding to the diameter of the first conductor 1' and a second end corresponding to the diameter of the second conductor 3'. The joint member 8 may therefore have a tapering shape, tapering in a direction from a first end of the joint member 8 to the second end of the joint member 8. The first end of the joint member 8 is arranged to be thermally joined with the first conductor 1' and the second end is arranged to be thermally joined with the second conductor 3'. The joint member 8 may for example be made of solid metal.

The first conductor 1' defining the first conductor section 13a' may according to one variation comprise an electrical insulation system 1a' prior to thermal joining with the joint member 8 and thus with the second conductor 3'. The second conductor 3' may according to one variation comprise an electrical insulation system 3a' prior to thermal joining with the joint member 8 and thus with the first conductor 1'. Further details, and variations, of the production process of a power cable formed by the first conductor 1' and the second conductor 3' will be described with reference to FIG. 4.

Similarly to the example shown in FIG. 1b, the power cable 5' comprises a sheath 7', i.e. an outer sheath, and an electrical insulation system 11' that extends continually from the first conductor section 13a' to the second conductor section 13b'. The electrical insulation system 11' may comprise one or more layers and forms a conductive core 9' together with the conductor 13'. Furthermore, the power cable 5' may also comprise one or more additional layers not disclosed in FIG. 1b, for example an armour layer and/or a corrugated sheath.

Figure 4:
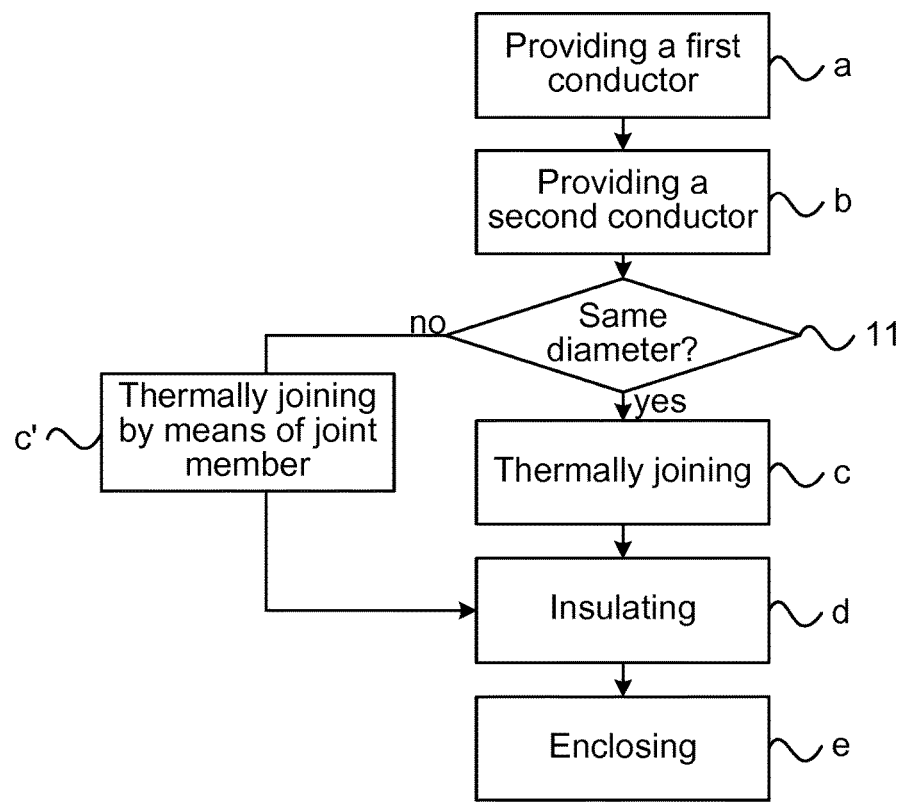
FIG. 4 shows a method of manufacturing the power cables in FIGS. 1b and 3b.

Methods of manufacturing a power cable 5, 5' will now be described in more detail with reference to FIG. 4.

In a step a) a first conductor 1, 1' is provided. The first conductor has a first cross-sectional layout that provides a first ampacity to the first conductor section 13a', 13a'.

In step a) the first conductor 1, 1' may according to one variation be provided with an electrical insulation system, e.g. in an extrusion process. Alternatively, the first conductor 1, 1' may be naked, i.e. it may be without an electrical insulation system at this point in the manufacturing process.

In case the first conductor 1, 1' is provided with an electrical insulation system in step a), thus forming a first conductive core, a portion of the electrical insulation system may be removed at one end of the first conductive core, to enable thermal joining with the second conductor 3, 3' in step c).

In a step b) a second conductor 3, 3' is provided. The second conductor 3, 3' has a second cross-sectional layout that provides a second ampacity for the second conductor section. The first ampacity is higher than the second ampacity.

In step b) the second conductor 3, 3' may according to one variation be provided with an electrical insulation system, e.g. in an extrusion process. Alternatively, the first conductor 1, 1' may be naked, i.e. it may be without an electrical insulation system at this point in the manufacturing process.

In case the second conductor 3, 3' is provided with an electrical insulation system in step b), thus forming a second conductive core, a portion of the electrical insulation system may be removed at one end of the second conductive core, to enable thermal joining with the first conductor 1, 1' in step c).

In case the diameter of the first conductor 1 and the diameter of the second conductor 3 is essentially the same, in a step c) the first conductor 1 and the second conductor 3 are thermally joined. They may be thermally joined for example by means of welding or brazing. The first conductor 1 thus forms the first conductor section 13a of the conductor 13 and the second conductor 3 forms the second conductor section 13b of the conductor 13.

In a step d) the first conductor section and the second conductor section are insulated by means of an electrical insulation system that extends continually from the first conductor section to the second conductor section, thereby forming a conductive core.

In the event the first conductor 1 and the second conductor 3 are naked, i.e. without an electrical insulation system, prior to step c), in step d) the insulation of the jointed conductor obtained by thermally joining the first conductor 1 and the second conductor 3, may involve extrusion. The entire jointed conductor 13 may thus be subjected to an extrusion process to obtain a coating defining the electrical insulation system.

Alternatively, as previously mentioned, the first conductor 1 and the second conductor 3 may already be provided with a respective electrical insulation system, prior to step c). Step d) may in this case involve insulating the first conductor section 13a and the second conductor section 13b by winding one or more layers of insulating material around the joint obtained by the thermal joining, and around any area not covered by an electrical insulation system, and thereafter curing this insulating material to obtain an electrical insulation system 11 that extends continually from the first conductor section 13a to the second conductor section 13b.

As an alternative to step c), in case the diameter of the first conductor 1' and the diameter of the second conductor 3' differs, as in the example of FIGS. 3a-3c, in an alternative step c') the first conductor 1' may be thermally joined with one end of the joint member 8 and the second conductor 3' may be thermally joined with the other end of the joint member 8. In particular, that end of the joint member 8 that corresponds to the diameter of the first conductor 1' is thermally joined with the first conductor 1' and the other end, i.e. the one that correspond to the diameter of the second conductor 3', is thermally joined with the second conductor 3'.

In case step c') is to be performed, the first conductor 1 and the second conductor 3 may beneficially already be provided with a respective electrical insulation system, prior to step c'). Step d) may in this case involve insulating the first conductor section 13a', the second conductor section 13b' and the joint member 8 arranged there between, by winding one or more layers of insulating material around the joint obtained by the thermal joining, and around any area not covered by an electrical insulation system, and thereafter curing this insulating material to obtain an electrical insulation system 11' that extends continually from the first conductor section 13a' to the second conductor section 13b', also covering the joint member 8.

In a step e) the conductive core 9, 9' is enclosed by means of a sheath 7, 7'.

Depending on the number of electrical phases of the power cable, a number conductive cores may be arranged within the sheath, for example one conductive core in case the power cable is a DC cable, and three conductive cores in case the power cable is a three-phase AC cable. Each one may be produced in the manners described hereabove.

It is envisaged that the power cable presented herein may be utilised in for example subsea applications or onshore applications, e.g. for power transmission or power distribution. The first conductor and the second conductor may for example be made of copper or aluminium.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A power cable comprising:
   a conductive core comprising a conductor including a plurality of sections, and an electrical insulation system enclosing the conductor, the electrical insulation system having an inner semiconductor layer, an intermediate polymeric layer, and an outer semiconductor layer, and
   a sheath enclosing the conductive core,
   wherein one of the plurality of sections of the conductor is a first conductor section and another of the plurality of sections of the conductor is a second conductor section, the first conductor section having a first cross-sectional geometry that provides a first ampacity for the first conductor section, and the second conductor section having a second cross-sectional geometry that provides a second ampacity for the second conductor section, wherein the first ampacity is higher than the second ampacity,
   wherein the plurality of sections are thermally joined, and wherein the electrical insulation system extends continually from the first conductor section to the second conductor section of the conductor,
   wherein the first conductor section comprises a plurality of strands and wherein the first cross-sectional geometry is a first strand configuration, and wherein the second conductor section comprises a plurality of strands and wherein the second cross-sectional geometry is a second strand configuration.

2. The power cable as claimed in claim 1, wherein the first conductor section is a segmented conductor.

3. The power cable as claimed in claim 1, wherein the second conductor section is a compacted conductor.

4. The power cable as claimed in claim 1, wherein the plurality of sections are thermally joined by means of welding.

5. The power cable as claimed in claim 1, wherein the first conductor section and the second conductor section are thermally joined.

6. The power cable as claimed in claim 1, wherein the conductor comprises a joint member defining one section of the plurality of sections, wherein the first conductor section is thermally joined with the joint member at one end of the joint member and the second conductor section is thermally joined with the joint member at the other end of the joint member.

7. The power cable as claimed in claim 1, wherein the power cable is a high voltage power cable.

8. The power cable as claimed in claim 1, wherein the power cable is a subsea cable.

9. The power cable as claimed in claim 6, wherein a diameter of the first conductor section is greater than a diameter of the second conductor section, and wherein the joint member tapers in a direction from a first end of the joint member to a second end of the joint member.

10. A method of manufacturing a power cable, comprising the steps of:
   a) providing a first conductor, wherein the first conductor has a first cross-sectional geometry that provides a first ampacity,
   b) providing a second conductor, wherein the second conductor has a second cross-sectional geometry that provides a second ampacity, wherein the first ampacity is higher than the second ampacity, the method further comprising at least one of the steps of:
- c) thermally joining the first conductor and the second conductor, whereby the first conductor forms a first conductor section of a conductor and the second conductor forms a second conductor section of the conductor, or
- c') providing a joint member between the first conductor and the second conductor, and thermally joining the joint member with the first conductor and with the second conductor, wherein the first conductor forms a first conductor section of a conductor and wherein the second conductor forms a second conductor section of the conductor, the method further comprising the steps of:
- d) insulating the first conductor section and the second conductor section by means of an electrical insulation system that extends continually from the first conductor section to the second conductor section, thereby forming a conductive core, the electrical insulation system having an inner semiconductor layer, an intermediate polymeric layer, and an outer semiconductor layer, and
- e) enclosing the conductive core by means of a sheath, wherein the first conductor section comprises a plurality of strands and wherein the first cross-sectional geometry is a first strand configuration, and wherein the second conductor section comprises a plurality of strands and wherein the second cross-sectional geometry is a second strand configuration.

11. The method as claimed in claim 10, wherein in step c) the first conductor and the second conductor are thermally joined by means of welding or wherein in step c') the first conductor, the joint member and the second conductor are thermally joined by means of welding.

12. The method as claimed in claim 10, wherein the first conductor section is a segmented conductor.

13. The method as claimed in claim 10, wherein the second conductor section is a compacted conductor.

14. The method as claimed in claim 10, wherein the power cable is a high voltage power cable.

15. The method as claimed in claim 10, wherein the power cable is a subsea cable.

16. The method as claimed in claim 10, wherein:
the step of providing a first conductor comprises providing the first conductor without insulation; and
the step of providing a second conductor comprises providing the second conductor without insulation.

17. The method as claimed in claim 16, wherein the step of insulating the first conductor section and the second conductor section comprises an extrusion process to obtain a coating which forms the electrical insulation system.

18. The method as claimed in claim 10, wherein at least one of:
the step of providing a first conductor comprises removing a portion of insulation surrounding the first conductor at one end of the first conductor; or
the step of providing a second conductor comprises removing a portion of insulation surrounding the second conductor at one end of the second conductor.

19. The method as claimed in claim 18, wherein the step of insulating the first conductor section and the second conductor section comprises:
winding one or more layers of insulating material around the joint formed by the thermal joining in step c) or around the joints formed by the thermal joining in step c'), and
curing the insulating material to form the electrical insulation system.

* * * * *